No. 12,601. REISSUED JAN. 29, 1907.

G. I. ROCKWOOD.

AUTOMATIC SPRINKLER.

APPLICATION FILED OCT. 30, 1906.

Witnesses

Roy D. Tolman.

Penelope Comberbach.

Inventor

George I. Rockwood.

By Rufus B. Fowler

Attorney

UNITED STATES PATENT OFFICE.

GEORGE I. ROCKWOOD, OF WORCESTER, MASSACHUSETTS, ASSIGNOR TO ROCKWOOD SPRINKLER COMPANY, OF WORCESTER, MASSACHUSETTS, A CORPORATION OF MASSACHUSETTS.

AUTOMATIC SPRINKLER.

No. 12,601. Specification of Reissued Letters Patent. Reissued Jan. 29, 1907.

Original No. 807,205, dated December 12, 1905. Application for reissue filed October 30, 1906. Serial No. 341,360.

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Automatic Sprinklers, of which the following is a specification accompanied by drawings, forming a part of the same, in which—

Figure 1:
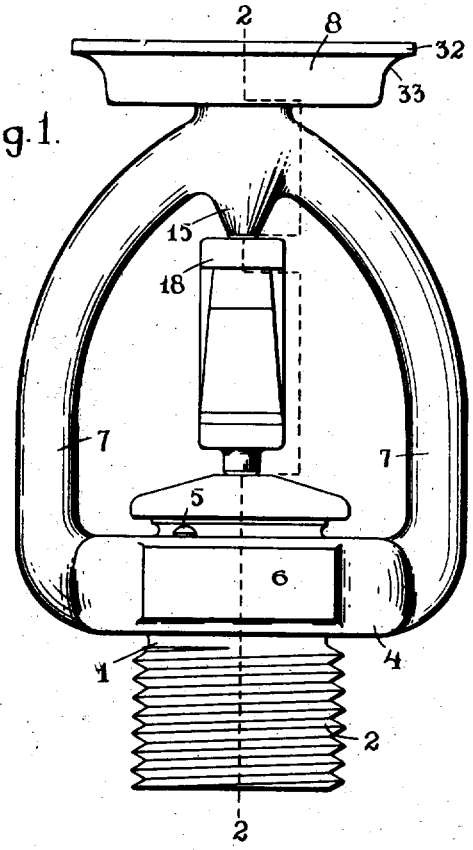
Figure 2:
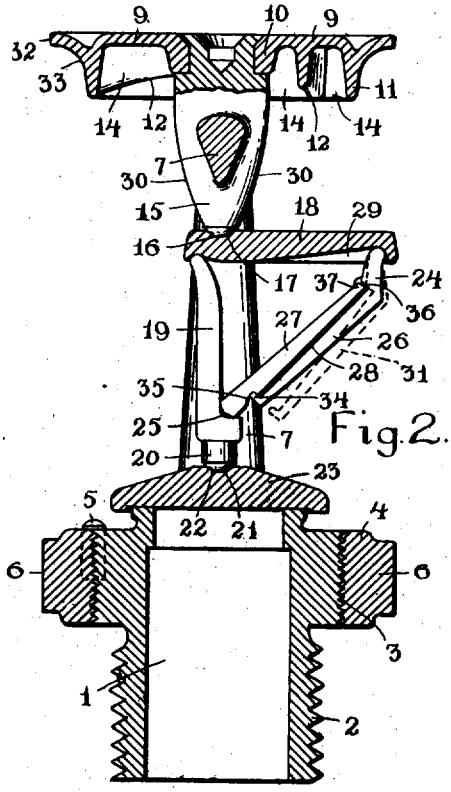
Figure 4:
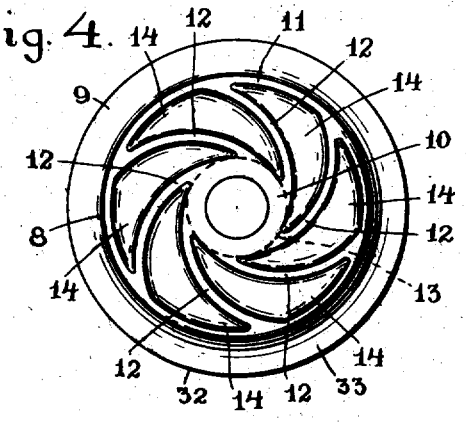
Figure 3:
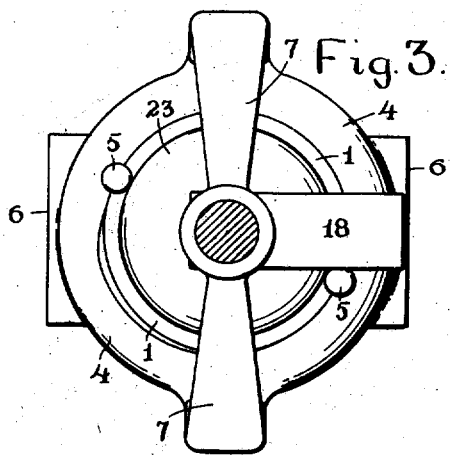

Figure 1 represents one of my improved sprinklers shown in elevation. Fig. 2 is a vertical sectional view on line 2 2, Fig. 1. Fig. 3 is a top view with the diffuser removed, and Fig. 4 is a detached and bottom view of the diffuser.

Similar reference-figures refer to similar parts in the different views.

My invention relates to certain improvements in that class of automatic sprinklers which are designed to release a stream of water under pressure and diffuse the same, the apparatus being operative when subjected to a certain degree of heat; and it consists in the construction and arrangement of parts, as hereinafter described, and pointed out in the annexed claims.

Referring to the accompanying drawings, 1 denotes a nozzle provided with a screw-thread 2, by which it may be connected with a pipe containing water under pressure, and also a screw-thread 3, adapted to receive the screw-threaded collar 4 of my improved automatic sprinkler. The collar 4 when applied to the end of the nozzle is prevented from turning thereon by the insertion of pins 5 5, Fig. 3, in the screw-threaded joint between the collar and nozzle. The collar 4 is also provided on diametrically opposite sides with the parallel flattened surfaces 6 6 for the application of a wrench, by which power may be applied to rotate the nozzle in attaching it to the pipe. The collar 4 also supports on diametrically opposite sides the vertical arms 7 7, which are united at their upper ends. Attached to the upper end of the arms is a diffuser 8, consisting of a circular disk 9, provided with a central hub 10 and a concentric depending rib 11. The hub 10 and concentric rib 11 are connected by a series of ribs 12, preferably curved, with the outer or convex sides of the ribs 12 tangential to a common circle inclosing the central hub 10 and indicated by the broken line 13, Fig. 4. The concentric rib 11 and the ribs 12 inclose a series of triangular recesses or cells 14. Depending from the uniting of the arms 7 is a tapering boss 15, having its axis coincident with the axis of the nozzle 1 and provided with a rounded end or tip 16, fitting a corresponding depression 17 in the upper side and near one end of a horizontal lever 18. The end of the lever 18 nearest the recess 17 bears upon the upper end of a post 19, provided at its lower end with a cylindrical tip 20, which is rounded at 21 and rests in a corresponding recess 22, formed in the upper surface of a cap 23, which rests upon and covers the upper end of the nozzle 1. The end of the lever 18 farthest from the recess 17 is supported upon the upper end of a brace or strut 24, the lower end of which rests upon a shoulder 25 in the post 19. The strut 24 is composed of two pieces 26 and 27, having contacting surfaces 28, which are soldered together by a fusible solder melting at a predetermined degree of heat, preferably approximating about 160°. The lower end of the piece 27 alone contacts with the shoulder 25, and the upper end of the piece 26 alone contacts with the lever 18. The lever 18 is provided with a recess 29 to receive the upper end of the strut-piece 26. The sides of the tapering boss 15 are preferably slightly convex, as shown at 30 30, Fig. 2, as this form of the boss has been found in practice favorable to the proper distribution of the stream of water as it impinges against the under side of the diffuser.

In assembling the various parts of the device the cap 23 is applied to the open end of the detached nozzle 1. The lever 18, supporting-post 19, and strut 24 are then placed in position, as shown in the drawings, and the collar 4 is screwed upon the end of the nozzle until the desired pressure is produced to securely hold the cap 23 upon the open end of the nozzle. Holes are then bored in the screw-threaded joint between the collar 4 and the nozzle, and the pins 5 are inserted to hold the collar from further rotation upon the nozzle and prevent any tampering with the adjustment of the apparatus.

The contacting surfaces of the post 19, lever 18, strut 24, and cap 23 I cover with a plating of gold to prevent corrosion of the surfaces, and thereby obviate all liability of these parts sticking together from long-continued exposure. The apparatus is applied to a water-pipe containing water under pressure, which is held in check by the cap 23 until the temperature of the room reaches the proper point to cause the fusion of the soldering material uniting the two strut-pieces 27 and 26. As soon as the adhesion of these two pieces is destroyed the piece 26 instantly swings away from the piece 27, as shown by the broken lines 31, causing the collapse of the entire structure interposed between the cap 23 and the boss 15, allowing the pressure of water in the nozzle 1 to force the cap 23 from its seat and ascend in a stream, which, parted by the sides of the tapering boss 19, impinges against the under side of the diffuser 8, entering the triangular cells 14, by which the stream of water is broken and distributed.

The disk 9 preferably projects beyond the depending flange 11, forming a lip 32 and presenting a concave surface 33 to an impinging stream of water, thereby increasing the diameter of the diffuser without increasing the diameter of the depending rib 11, which preferably is small enough to prevent any of the collapsible pieces of the device from lodging on the diffuser in case the apparatus is supported in an inverted position.

The piece 26 of the strut 24 is preferably provided with a lip 34, which enters a recess 35 in the piece 27, thereby interlocking the opposing surfaces of the two pieces 26 and 27 and facilitating the attachment of the two pieces together. The piece 26 is also provided with a shoulder 36, against which the end 37 of the piece 27 abuts, thereby preventing any longitudinal sliding movement of the piece 26 on the piece 27. As the solder melts the downward pressure exerted by the lever 18 on the end of the strut by means of the shoulder 36 causes a rocking motion of the piece 26 on the end 37 of the piece 27, which in turn crowds against the piece 26, producing an instant separation of the opposing soldered surfaces, as illustrated by the broken lines 31, Fig. 2, thereby obviating all possible danger of the continued union of the component parts of the strut and insuring the certain collapse of the retaining structure and the release of the cap 23. The end 37 is beveled to limit the area of its contacting surface with the shoulder 36, and thereby facilitate the rocking movement of the shoulder on the end 37 as the piece 26 swings away from the piece 27. By the employment of the shoulder 36 a short distance below the upper end of the strut contacting with the end of piece 27 the latter serves as a fulcrum for the rocking movement of the piece 26, causing the pressure which is applied to the end of the strut to be utilized in the separation of the soldered surfaces of the component parts of the strut.

The piece 26 forms a two-armed lever capable of rocking about the end 37 as a fulcrum, which is removed but a short distance from the line of pressure resisted by the strut, whereby a leverage is obtained which reduces the force required to hold the soldered surface of the two pieces 26 and 27 together below that exerted by the lever 18, rendering the apparatus more delicate and certain in its operation at a predetermined degree of heat. I thus avoid the liability of releasing the cap before the proper degree of heat is reached and prematurely flooding the premises with water.

What I claim as my invention, and desire to secure by Letters Patent, is—

1. In an automatic sprinkler, the combination with a water-nozzle, and a cap closing said nozzle, of a fixed boss and a cap-retaining device between said cap and said boss, comprising a lever arranged parallel to said cap, a post having one end bearing against said cap and its opposite end bearing against one end of said lever, and a strut interposed between said post and the opposite end of said lever, said strut consisting of attached pieces detachable by heat.

2. In an automatic sprinkler, the combination with a water-nozzle, and a cap closing said nozzle, of a cap-retaining device comprising a lever arranged parallel to the cap, a post resting upon said cap and supporting one end of said lever, a strut placed at an oblique angle to said post, and interposed between said post and the opposite end of said lever, said strut consisting of attached pieces detachable by heat, and means for applying pressure to said lever between its supported ends.

3. In an automatic sprinkler, the combination with a water-nozzle, and a closing-cap for said nozzle, of a fixed boss having its axis coincident with the axis of the nozzle, a lever bearing against said boss, and between its ends, a post interposed between one end of said lever and said cap, and a strut interposed between said post and the opposite end of said lever, the integrity of said strut being destroyable by heat.

4. In an automatic sprinkler, the combination with a water-nozzle, and a closing-cap for said nozzle, of a fixed boss above said cap, a lever parallel with the cap and bearing against said boss, a post bearing on said cap and supporting one end of said lever and a strut resting against a shoulder on said post and supporting the opposite end of said lever, means for varying the distance between said boss and said cap.

5. In an automatic sprinkler, the combination with a water-nozzle, and a cap closing said nozzle, of a fixed boss above said cap, and a cap-retaining device interposed between said boss and said cap and consisting of a frame comprising an upright post, an oblique strut bearing against said post, and a lever supported upon said post and strut and bearing against said boss, one member of said retaining device being composed of pieces attached together by solder fusible at a predetermined degree of heat.

6. In an automatic sprinkler, the combination with a water-nozzle and a cap closing said nozzle, of a cap-retaining device, comprising a post mounted on said cap, a lever having one end resting on said post, means for applying pressure to said lever between its ends, a strut interposed between said post and the opposite end of said lever, said strut consisting of two united parts detachable by heat, and having means for preventing the sliding movement of one part on the other in the direction of the line of pressure.

7. In an automatic sprinkler, comprising a water-nozzle and a cap closing said nozzle, the combination with said cap of a retaining device consisting of a post mounted on said cap, a lever having one end supported by said post, a strut interposed between said post and the opposite end of said lever, said strut consisting of two united parts detachable by heat, and provided with shoulders for preventing the longitudinal sliding movement of one of said parts on the other.

GEORGE I. ROCKWOOD.

Witnesses:

PENELOPE COMBERBACH,
RUFUS B. FOWLER.